United States Patent
van Leeuwen et al.

[11] Patent Number: 5,713,157
[45] Date of Patent: Feb. 3, 1998

[54] DECK HANGER

[75] Inventors: Martin van Leeuwen, Tilburg; Gerardus E. C. van Gijsel, Goirle, both of Netherlands

[73] Assignee: Erico International Corporation, Solon, Ohio

[21] Appl. No.: 826,908

[22] Filed: Apr. 9, 1997

Related U.S. Application Data

[60] Provisional application No. 60/014,918 Apr. 10, 1996
[51] Int. Cl.$^6$ ............... A47F 5/60; E04B 1/38; E04C 2/40
[52] U.S. Cl. ............... 52/39; 52/220.6; 52/698; 52/526.06; 52/526.08; 248/201; 248/300; 248/317
[58] Field of Search ............... 52/39, 713, 712, 52/506.06, 506.08, 220.6, 220.1, 336, 338, 404.5, 407.2, 698; 248/300, 201, 317

[56] References Cited

U.S. PATENT DOCUMENTS

| | | | |
|---|---|---|---|
| 2,905,426 | 9/1959 | Ross | 248/300 X |
| 2,916,712 | 12/1959 | Lee | 52/712 X |
| 4,575,983 | 3/1986 | Lott, Jr. et al. | 52/713 X |

OTHER PUBLICATIONS

Erico Fixing Products Catalog, ©1988 by ERICO®, pp. 22–37.
Caddy Fasteners Catalog, ©1988 by ERICO® Products, Inc.
Caddy® Fasteners Idea Book, Mar. 1978, 2 pages.

*Primary Examiner*—Robert Canfield
*Attorney, Agent, or Firm*—Renner, Otto, Boisselle, Sklar

[57] ABSTRACT

A deck hanger utilizes two sheet metal spring hanger clips to hook behind parallel accessible edges of a deck installation. Each clip has a body which includes a rectangular hole. A rectangular bar is positioned through the holes and U-shape blocking clip straddles each hanger clip body securing the bar in place. The bar spans a downwardly opening channel formed by the deck panels and supports cable trays, piping or other installations utilizing what might normally be dead space. Each clip also has a hook portion with a back having a barb and a nose portion no thicker than the sheet metal from which it is formed to enable grasping of the edges without distortion.

8 Claims, 1 Drawing Sheet

DECK HANGER

This application is a Continuation of Provisional application Ser. No. 60/014,918 filed Apr. 10, 1996.

DISCLOSURE

This invention relates generally as indicated to a deck hanger, and more particularly, to a deck hanger for suspending loads over a substantial span without compromising the deck.

BACKGROUND OF THE INVENTION

Trapezium decking is widely used in building construction. The decking comprises large ribbed metal sheets which are placed on a frame and over which concrete is poured to form flooring. The decking remains in place and becomes the unfinished ceiling of the floor below. A wide variety of utilities and a finished ceiling may be suspended from the deck. In order to hang loads from the deck, various holes or strikes may be made in the deck and some are even included by the manufacturer for such purpose. Most deck sheets include one or more trapezoidal ribs and when positioned, overlap each other to a certain extent, usually around the bottom of one of such ribs. The overlap may extend from the bottom partly up a steeply inclined surface of such rib presenting a deck panel edge on which a hanger clip may be positioned. Such edges are used with hook-shape hangers with wire ties or threaded rod for hanging drop ceilings, light fixtures and other utilities suspended below the deck. Even trapeze bars or struts may be suspended below the decks in similar fashion with threaded rod extending between the clip and bar. The trapeze strut may in turn support a cable tray for example. This positions the strut and tray substantially below the bottom of the deck and requires, in addition to space, a lot of parts such as nuts and washers which may have to be threaded on long lengths of rod, positioned, leveled, adjusted and tightened.

The trapezium decking, not to be confused with a trapeze strut, may vary substantially in configuration and depth of the ribs. The ribs, however, form on the underside of the decking downwardly opening parallel channels which may vary in width and depth. In the design of the building, the space volume of such channels is usually wasted, requiring excess floor-to-floor height in a building, which is directly related to cost.

It would accordingly be advantageous to utilize such wasted space and also be able to form a trapeze type hanger for such space which could be suspended directly from deck hanger clips without using threaded rod or wires and the cost, complexities, and space associated with such hanging systems.

SUMMARY OF THE INVENTION

Sheet metal clip deck hangers are positioned on the accessible edge of successive trapezium rib deck panels and aligned transversely of the ribs. Each hanger snaps over the exposed overlap edge and is seated simply by pulling the hanger down. Each hanger includes an angled panel edge hook and a vertically oriented or generally plumb lower body with a rectangular hole through the face of the body. A rectangular bar is inserted through the holes of the aligned clips to span beneath at least one downwardly opening channel between the trapezium ribs. Blocking clips are then snapped over the bar straddling the body of the clip at the hole. The blocking clips are U-shape and include slots in each leg which straddle the clip body from the edge, keeping the bar in place. The span of the bar is then used to support a variety of items such as cable trays, piping, conduit or other installations, while at the same time taking advantage of the normally dead space immediately below the deck and between the ribs.

The angled panel edge hook has a barb in the back and a nose portion without any strikes or distortions so that it is as thin as the thickness of the sheet metal blank from which it is made. In this manner it can grasp the accessible edge without distortion.

To the accomplishment of the foregoing and related ends, the invention then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
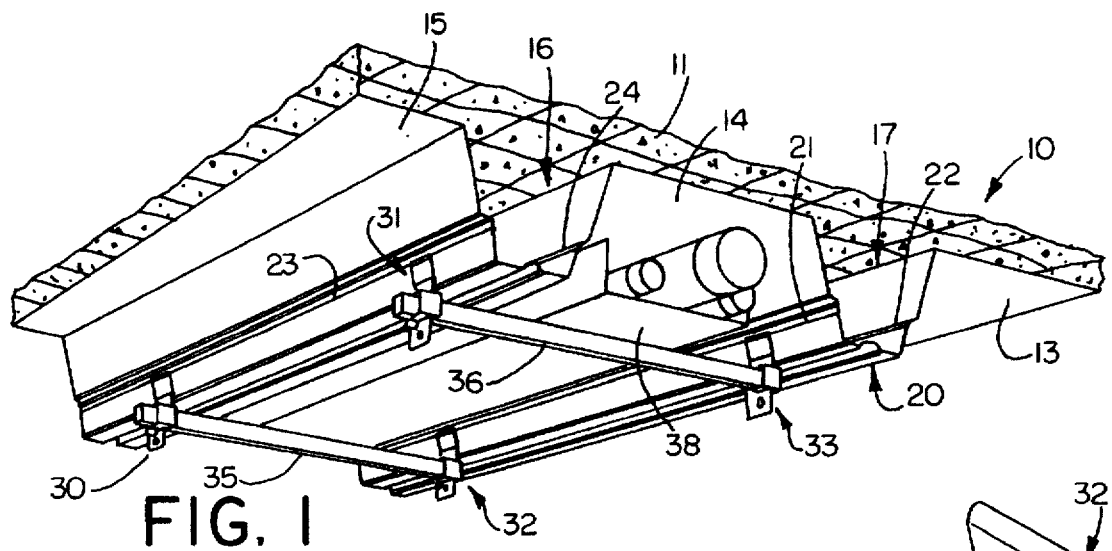
FIG. 1 is a fragmentary perspective view of a roof or deck showing an installation in accordance with the present invention.
Figure 4:
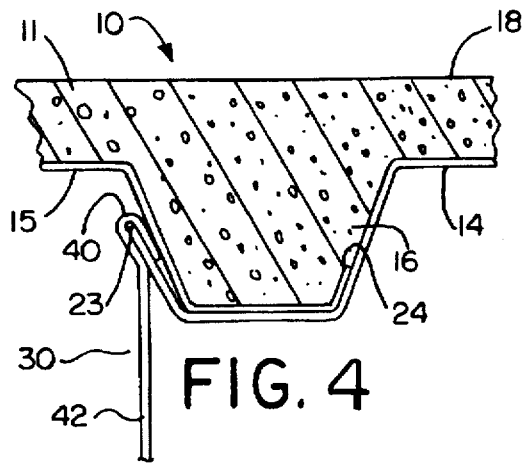
FIG. 4 is a transverse section through the decking showing how the hook grasps the accessible edge.

Referring initially to FIGS. 1 and 4, there is illustrated a composite deck shown generally at 10 which includes a concrete overlay 11 supported on sheet metal trapezium panels shown at 13, 14 and 15. The panels 13 and 15 are only partially shown, but each includes a rib formation which internests to form the substantial structural ribs seen at 16 and 17. As is illustrated more clearly in FIG. 4, the ribs are normally filled with concrete and the upper surface 18 forms the floor or roof above while the exposed panels on which the concrete is placed form the unfinished ceiling below.

The rib formation of the panel 13 is illustrated at 20 and terminates in an accessible edge 21. The panel 14 also includes a rib formation which nests inside the formation 20 and terminates at the inaccessible edge 22. The panel 14 terminates at an accessible edge 23 while the overlapping edge of the panel 15 terminates at the inaccessible edge 24. It is to the accessible edges 23 and 21 that the strut hanger of the present invention is attached.

The present invention utilizes hanger clips which are shown at 30 and 31 engaging the edge 23 while hanger clips 32 and 33 are shown engaging the parallel edge 21. The hanger clips are positioned transversely aligned and bars seen at 35 and 36 span such hanger clips, supporting a load in trapeze fashion, the load shown being a cable tray 38. The downwardly extending ribs 16 and 17 form a downwardly opening channel and the load is at least partially supported in such channel. The space within the channel would ordinarily be dead space.

Figure 2:
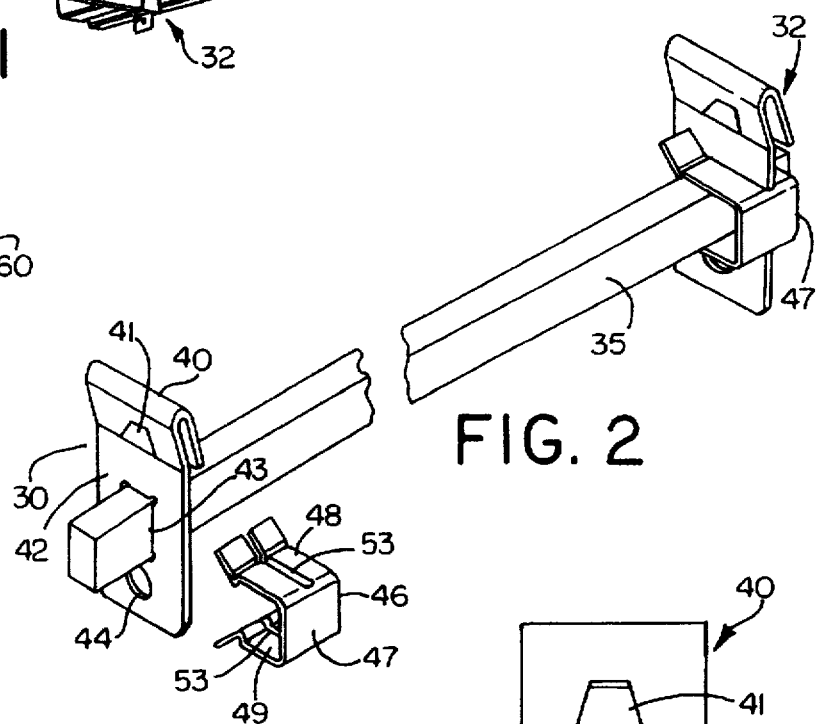
FIG. 2 is an enlarged perspective view broken away illustrating the parts of the hanging system.

Referring now more particularly to FIG. 2, it will be seen that each hanger clip includes an upper inclined hook portion 40 which may include a struck barb 41. The barb is positioned in the backside of the hook, and the nose or downturned portion is overall as thin as the thickness of the blank from which the hanger clip is made. In this manner the hook can grasp the accessible edge of the deck panel even though there is minimum clearance behind the edge. The hook can thus be inserted on the edge without significant or permanent edge deformation.

The hanger clip 30 in addition to the upper hook portion 40 includes a vertically extending body portion 42 which is designed to extend vertically or generally plumb. The hook snaps over the edge 23 and is pulled downwardly to lock onto the accessible edge. The body portion then extends vertically and includes a rectangular hole 43 and a lower circular hole 44. Each hanging clip is a spring steel clip formed from sheet metal of uniform width and the holes 43 and 44 are centered in a major face of the body between the edges of the clip. After the operator installs the hanging clips as shown, he or she then inserts a rectangular, preferably square bar, through the paired clips and to secure the bar in place to the clips, blocking clips shown at 46 and 47 in FIG. 2 are then installed.

Each blocking clip is also spring steel and generally U-shape including a back or bight portion 47 and legs 48 and 49. Each leg is slotted as seen at 53. These slots accommodate the body of the hanging clip so that the blocking clip may be inserted horizontally with the two portions of the legs formed by the slots straddling the hanging clip.

Figure 3:
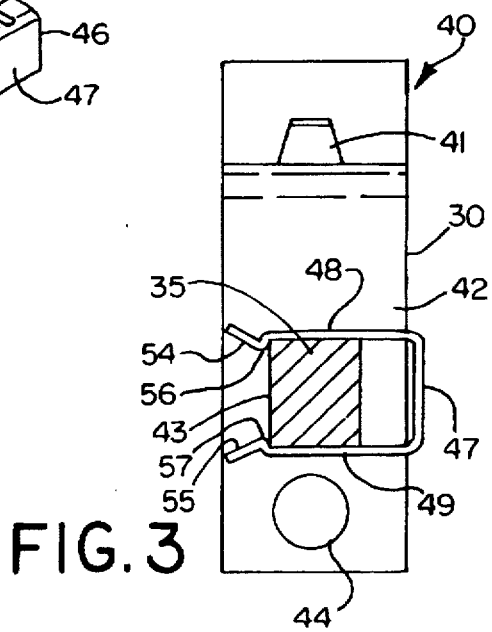
FIG. 3 is an enlarged section through the installed bar showing the blocking clip in place.

The tips of the legs may include flared sections seen at 54 and 55, each of which create respective heels 56 and 57, shown more clearly in FIG. 3. When the clip is installed as seen in FIG. 3, the heels snap behind the opposite corners of the bar 35.

Figure 5:
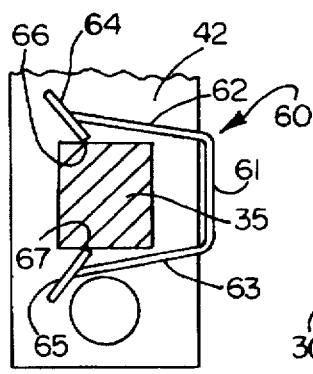
FIG. 5 is a fragmentary view like FIG. 3 showing a modified form of blocking clip.

As seen in FIG. 5, there is illustrated an alternative form of the clip shown at 60. The clip is U-shaped with a bight portion 61 and slotted legs 62 and 63. The flared ends of the legs shown at 64 and 65 include rearwardly struck sharp barbs 66 and 67 which bite into and lock against the top and bottom surfaces of the bar 35 securing the bar to the hanger clip.

It can now be seen that there is provided a deck hanger which includes the two hanger clips, the bar, and two blocking clips. No tools are needed to install the hanging system and no nuts, washers, or long threaded rods are employed. The hanging system utilizes the space between the downwardly opening ribs in the deck system.

To the accomplishment of the foregoing and related ends, the invention then, comprises the features hereinafter fully described and particularly pointed out in the claims.

We claim:

1. A deck hanger assembly comprising spaced hanger clips grasping accessible edges on the underside of deck panels, each hanger clip having a hole, a bar inserted through each hole and spanning between said spaced hanger clips beneath the deck panels, and blocking clips at each hanger clip securing the bar to each hanger clip.

2. A deck hanger assembly as set forth in claim 1 wherein each said hole and said bar are rectangular.

3. A deck hanger assembly as set forth in claim 2 wherein said blocking clips are U-shape and each include slotted legs receiving a hanger clip.

4. A deck hanger assembly as set forth in claim 3 wherein said blocking clips snap over an edge of said bar and straddle a hanger clip.

5. A deck hanger assembly as set forth in claim 3 wherein said blocking clips are inserted horizontally at each hanger clip and grasp said rectangular bar.

6. A deck hanger assembly as set forth in claim 3 wherein said blocking clips include barbs biting into said bar when installed.

7. A deck hanger assembly as set forth in claim 1 wherein said deck panels include trapezium ribs forming downwardly opening channels, said bar spanning at least one channel to support a load at least partially within such channel.

8. A deck hanger assembly as set forth in claim 1 wherein each hanger clip includes a further hole so that other or additional loads may be suspended therefrom.

* * * * *